(12) United States Patent
Johnson et al.

(10) Patent No.: US 8,482,841 B1
(45) Date of Patent: Jul. 9, 2013

(54) MAGNETIC SPIN BASED PHOTONIC/PLASMONIC DEVICES

(75) Inventors: Mark B Johnson, Potomac, MD (US); Abdulhakem Elezzabi, Edmonton (CA); Kenneth J. Chau, Edmonton (CA)

(73) Assignees: The United States of America, as represented by the Secretary of the Navy, Washington, DC (US); University of Alberta, Edmundton, Alberta (CA)

( * ) Notice: Subject to any disclaimer, the term of this patent is extended or adjusted under 35 U.S.C. 154(b) by 6 days.

(21) Appl. No.: 13/153,261

(22) Filed: Jun. 3, 2011

Related U.S. Application Data

(63) Continuation of application No. 12/405,756, filed on Mar. 17, 2009, now Pat. No. 7,978,394.

(60) Provisional application No. 61/037,236, filed on Mar. 17, 2008.

(51) Int. Cl.
*G02F 1/09* (2006.01)

(52) U.S. Cl.
USPC ........................................................ 359/282

(58) Field of Classification Search
USPC ........................................................ 359/282
See application file for complete search history.

(56) References Cited

U.S. PATENT DOCUMENTS 7,006,273 B2 * 2/2006 Sahashi et al. ............... 359/280

* cited by examiner

*Primary Examiner* — Joseph P Martinez
(74) *Attorney, Agent, or Firm* — Amy L. Ressing; L. George Legg

(57) ABSTRACT

A photonic/plasmonic device is disclosed that uses a ferroelectric material and its magnetization state in order to affect the physical properties of electromagnetic waves. The magnetization state of the ferromagnetic material may either be zero or nonzero. When the magnetization state of the ferromagnetic material is non-zero physical properties of the electromagnetic waves are altered. This effect can be used to make switches and the like.

12 Claims, 6 Drawing Sheets

MAGNETIC SPIN BASED PHOTONIC/PLASMONIC DEVICES

This Application claims the benefit of U.S. Provisional Application No. 61/037,236 filed on Mar. 17, 2008, the contents of which are herein incorporated by reference.

BACKGROUND OF THE INVENTION

1. Field of the Invention

The invention relates to magnetic spin based photonic/plasmonic devices. In particular the present invention is related to modulation via a magnetic field of electromagnetic signals in photonic/plasmonic devices that may partially comprise a ferromagnetic material which may be a layer exhibiting a spin-dependent permittivity, permeability or electron transport.

2. Description of the Related Technology

With the growing demand for high-speed, high bandwidth information technology, there has been increasing interest in the use of photonic devices to carry and control information signals. Modulators, switches, and filters are key components of any information-based technology. The development of photonics devices, with these functionalities and based on the application of external electric fields or acoustic signals, has been well established. However, there has been relatively little attention paid to modulation, switching, and filtering schemes based on the application of a magnetic field, apart from a small class of magneto-optic devices.

Surface plasmon waves are waves that propagate along the surface of a conductor, wherein the conductor is usually a metal. Surface plasmon waves offer a way to channel light on a chip using sub-wavelength structures. Miniaturized circuits can convert light into a surface plasmon, which can then be propagated and processed by logic elements located on the circuit before being converted back into light. The circuitry used to propagate surface plasmon waves may also be used to carry electrical signals or may be integrated with separate digital electronic circuits.

A new branch of photonics that uses surface plasmon waves is called plasmonics. Plasmonic circuits may have basic component functionality, including waveguides, switches and tuners, W. L Barnes et al, Nature, vol. 424, 824 (2003), S. A Maier et al., Nature Materials, vol. 2, 229 (2003), and S. A. Maier et al., Advanced Materials, vol. 13, 1501 (2001) and N. Engheta et al. "Circuit elements at optical frequencies: nano-inductors, nano-capacitors, and nano-resistors", Phys. Rev. Lett. 95, 095504 (2005). One of the major challenges in active plasmonic and nanoplasmonics devices is the ability to directly control the coherent plasmon oscillations via external stimulus. This stems from the fact that direct manipulation of the electron density distribution within the metal's conduction band is necessary for such a purpose. However, unlike carriers in semiconductors, in metals the free electron density is very high and the Fermi level is located high within the conduction band. Thus, external modulation of the density of state is very challenging in achieving any tangible modulation on the metal's optical properties. Effectively, directly modulating the density of the state of the electrons in the conduction band is notably insignificant on the characteristic conductivity, amplitude, phase, and plasmons oscillating frequency. One way to achieve these functionalities is via the manipulation of the electron spin state. Spintronic devices that exploit electron spin rather than the charge enable nano-scale logic devices with enhanced functionality and lower power consumption. M. Johnson, I.E.E.E. Spectrum vol. 37 (2), 33 (2000); U.S. Pat. No. 6,804,146; U.S. Pat. No. 6,809,959; U.S. Pat. No. 7,050,329; and U.S. Pat. No. 7,068,535.

However, the advantages of both spintronic and plasmonic technologies have not been fully realized. Therefore there is a need in the field to combine the advantages of both spintronic and plasmonic technologies in order to obtain low power, functionally diverse photonic/plasmonic devices.

SUMMARY OF THE INVENTION

An object of one aspect of the present invention is the provision of a photonic/plasmonic device that uses the magnetization state and/or spatial orientation of a ferromagnetic layer, which may be a material layer exhibiting spin-dependent permittivity, or permeability, or electron transport.

Another object of one aspect the present invention is the provision of a photonic/plasmonic device that modulates electromagnetic waves based upon the magnetization state and/or spatial orientation of the ferromagnetic layer, which may be layer exhibiting spin-dependent permittivity, or permeability, or electron transport.

A first aspect of the invention may be a photonic/plasmonic device comprising: a source of electromagnetic waves; a first layer comprising a ferromagnetic material having a magnetization state that is either substantially zero or non-zero with a spatial orientation; and wherein a property of an electromagnetic wave from the source of electromagnetic waves is altered by the magnetization state; and a detector of electromagnetic waves.

Another aspect of the invention may be an array of photonic/plasmonic devices comprising: a source of electromagnetic waves; a first photonic/plasmonic device comprising; a first layer comprising a first ferromagnetic material having a magnetization state that is either substantially zero or non-zero with a spatial orientation; and wherein a property of an electromagnetic wave from the source of electromagnetic waves is altered by the magnetization state; a second photonic/plasmonic device comprising; a second layer comprising a second ferromagnetic material having a second magnetization state that is either substantially zero or non-zero with a spatial orientation; wherein a property of an electromagnetic wave from the source of electromagnetic waves is altered by the second magnetization state, the second photonic/plasmonic device further comprising a third layer comprising a nonmagnetic material; and a detector of electromagnetic waves.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter.

DETAILED DESCRIPTION OF THE PREFERRED EMBODIMENT(S)

Figure 1:
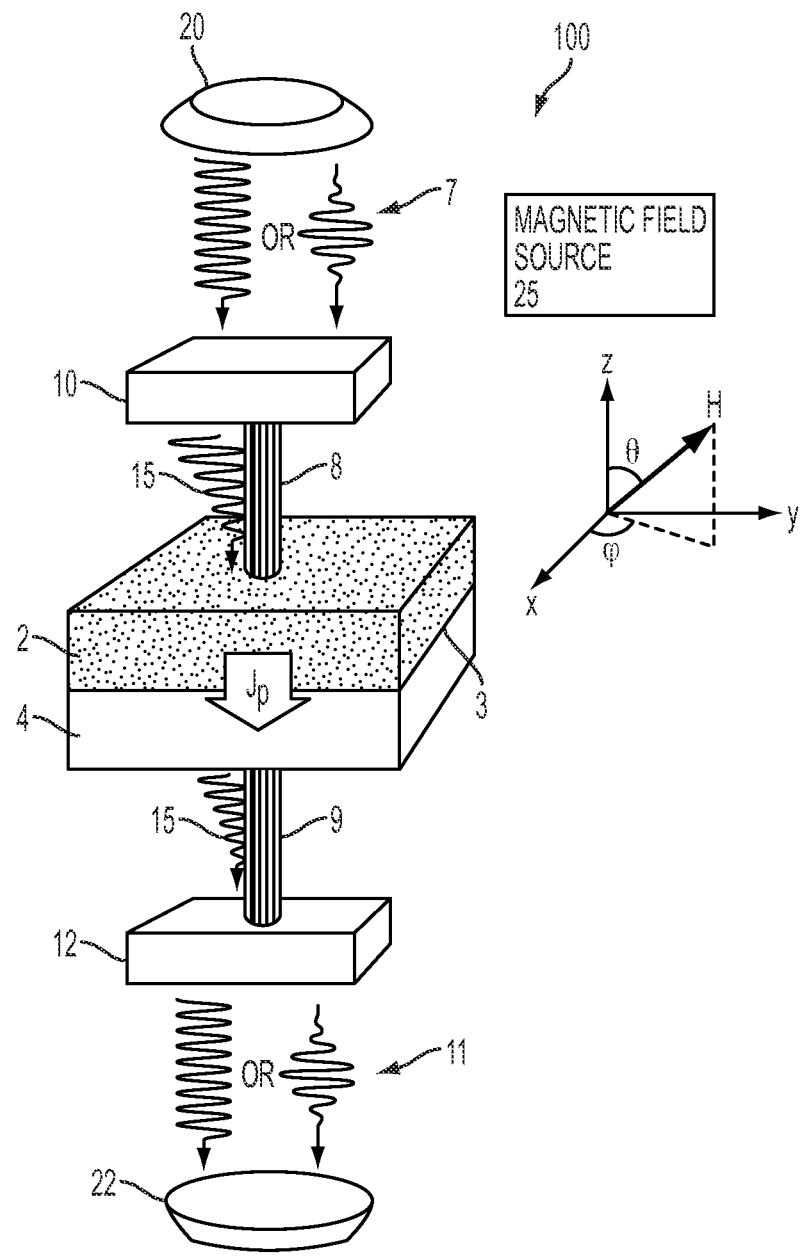
FIG. 1 shows a photonic/plasmonic device having a ferromagnetic layer and a nonmagnetic layer, in accordance with an embodiment of the present invention.

The present invention is a new class of spin-based photonic/plasmonic devices with modulating, non-volatile switching and filtering functions that are sensitive to a magnetic field. The photonic/plasmonic devices use resistance and/or impedance properties that depend on conduction electron spin and/or the magnetization of the materials used in the device. This is accomplished via the orientation of a ferromagnetic layer in the photonic/plasmonic device and the applied magnetic field. It should be understood that the term "ferromagnetic layer" is also intended to capture layers exhibiting spin-dependent permittivity, or permeability, or electron transport. The modulation of the photonic/plasmonic device is typically controlled by a magnetic field, and the physical mechanism may involve electron spin accumulation, giant magneto-resistance, and/or anisotropic magneto-impedance. This type of photonic/plasmonic device is generally referred to as a plasmon-spintronic device herein.

The principles involved in the present invention have been established using experiments with granular media. The photonic/plasmonic devices may be miniaturized and integrated, using thin film and lithography techniques, into existing information technology. The photonic/plasmonic device of the present invention is a plasmon-spintronic device, which is a hybrid photonic device combining spintronic and plasmonic technologies. A plasmon-spintronic device may also be called a spinplasmonic device. The photonic/plasmonic devices of the present invention will operate over a band spectral region, ranging from radio to optical frequencies.

The physics underlying the operation of this new class of photonic/plasmonic devices is described below. The physical principles have been validated for the experimental system of granular media as well as for integrated thin film structures. The plasmon-spintronic device of the present invention may generally comprise a multilayered structure of alternating ferromagnetic and nonmagnetic layers.

A photonic/plasmonic device comprises an arrangement (ordered or random) of ferromagnetic layers, which may be a layer exhibiting spin-dependent permittivity, permeability and/or electron transport. The ferromagnetic materials may be selected from any group of ferromagnetic materials used in spintronic devices, which may also include materials exhibiting spin-dependent permittivity, permeability and/or electron transport. It is typical to use a transition metal ferromagnet such as Co, Ni, Fe, or any alloy of these materials; a class of doped magnetic semiconductor materials may also be used. These materials may be patterned to sub-wavelength sizes, wherein the wavelength size is approximately the same that of the incident vacuum electromagnetic wave to form either a two dimensional or a three dimensional photonic/plasmonic device or network. The ferromagnetic materials may be layered with a nano-scale coating of any conductive, nonmagnetic material, or a semi-metal or a doped semiconductor, or any material that supports collective conduction electron oscillations. The choice of nonmagnetic material depends on the wavelength of the plasmon. As an example, copper or gold layers might be used with THz plasmons. The thickness of the nonmagnetic layer film is typically less than the spin diffusion length of the nonmagnetic layer film, and may be of the order of between 1 nm to 200 nm. The optimal thickness may depend upon the desired wavelength that is being detected or used. For Example, for THz plasmons, a 100 nm thick layer of gold may be used for the nonmagnetic layer.

The ferromagnetic layer and the nonmagnetic layer form a major part of the plasmon-spintronic device. When coherent electromagnetic radiation, selected from optical to radio frequencies, is coupled to the layered plasmon-spintronic device, the electric and magnetic fields of the radiation penetrate into the surface layers of the plasmon-spintronic device and induce charge motion, or displacement, within a characteristic thickness of a skin depth of the electromagnetic radiation. The carrier motion, typically motion of electrons, can be described as an electric current density, and in particular there is current, conduction and/or displacement current, flow near and across the interfaces of the plasmon-spintronic device. The coherent electron density motion may be described as a surface wave, a surface plasmon wave, a surface plasmon-polariton, a surface particle plasmon, a Zenneck wave, a surface bound wave, a propagating surface charge density wave, particle plasmon oscillations, a particle plasmon wave or a diffracted evanescent wave. Herein, it is generally referred to as a surface plasmon wave. All such nomenclature essentially refers to conduction electron oscillation on a metallic or conducting surface driven by a coherent electromagnetic field. The coupled radiation-induced charge motion within the surface of the plasmon-spintronic device extends to the vicinity of the interface between the ferromagnetic layer and the nonmagnetic layer. This may be seen in the embodiment shown in FIG. 1. More generally, the charge motion extends to the plasmon-spintronic structure which may involve the interface between ferromagnetic layer and nonmagnetic layer, a first ferromagnetic layer/a nonmagnetic layer/second ferromagnetic layer structure, or a single ferromagnetic layer.

As with other magnetic devices, the bistable (hysteresis) states associated with the magnetization orientation of the ferromagnetic layer(s) enables the operation of the plasmon-spintronic device as a nonvolatile switch. "Nonvolatile" means the device has bistable states, which can be called 0 and 1 or ON and OFF, the state of the device is set by a magnetic field, and the state of the device is then maintained even when no power is supplied to the device or structure. By applying a small magnetic field, the magnetization state of the ferromagnetic layer(s) is switched to a given orientation and the conduction electron spins are aligned along this axis. The magnetized orientation and the alignment of electron spins in the ferromagnetic layer will remain in that state when the magnetic field is removed and do not require the further application of power. This principle allows the plasmon-spintronic devices to operate as non-volatile photonic switches that can operate with zero quiescent power.

Additionally, it has been noted in experiments using ferromagnetic particles coated with paramagnetic layers that, the magnetically induced amplitude attenuation of electromagnetic signals in the ferromagnetic/paramagnetic composite is spectrally non-uniform. In particular, it was observed that the higher frequency components of the incident radiation are preferentially attenuated relative to the lower frequency components. The spectral selectivity exhibited by these materials enables plasmon-spintronic devices designed having a ferromagnetic particles coated with paramagnetic layers to function as a magnetically tunable photonic frequency filter. By application of a magnetic field, the device may preferentially attenuate certain frequency components of the radiation relative to other components. Therefore, in plasmon-spintronic devices designed having a ferromagnetic layer and a paramagnetic composite the spectral transmission can be tuned via an externally applied magnetic field. The preferential attenuation is not restricted to the devices fabricated with particles. This property may also exist when using a thin film waveguide design.

Experiments also demonstrate that a phase delay of the electromagnetic wave interaction may be associated with the variable amplitude transmission, and may therefore be tuned by the magnetic field. This property may be exploited in order to obtain temporal filtering functionality, magnetically tunable delays, asynchronous buffering of data, and magnetically tunable interference. Phase delay may also occur when using a thin film wave guide devices.

As discussed above, the principles of the plasmon-spintronic devices made of ferromagnetic layers and nonmagnetic layers are valid in patterned, two-dimensional or three dimensional layered structures integrated on a chip. The layers of the plasmon-spintronic devices may be patterned to form transmission lines to carry or emit electromagnetic signals, within the range of optical to radio frequencies. Other photonic/plasmonic devices which can employ the plasmon-spintronic devices may be photonic/plasmonic switches, photonic/plasmonic modulators, photonic/plasmonic memory cells, photonic/plasmonic polarization modulators, photonic/plasmonic frequency selective filters and surfaces, photonic/plasmonic transmission lines, photonic/plasmonic spin transistors and/or sensors, photonic/plasmonic antennae, photonic/plasmonic bandgap structures. Photonic/plasmonic active lenses and photonic/plasmonic metamaterial devices. Types of photonic/plasmonic modulators which can employ the plasmon-spintronic device may be interferometers, directional couplers/couplers, multi-port multiplexers, beam deflectors, resonant cavities, ring resonators, hybrid junctions, power dividers, split ring resonators, phase shifters and polarization sensitive device couplers. The plasmon-spintronic device may be mounted on a semi-conductor substrate or on top of a non-conductive layer.

Plasmon-spintronic devices that are constructed in accordance with the principles discussed above are shown in the drawings. In the drawings discussed below like numerals refer to similar structures throughout the drawings.

In FIG. 1, a plasmon-spintronic device 100 is shown. The plasmon-spintronic device 100 has a ferromagnetic layer 2 and a nonmagnetic layer 4. The ferromagnetic layer 2 may have a thickness between 1 nm to 200 nm. However, it should be understood that the materials and their respective thicknesses will depend on the wavelength that is to be used or detected. Thicker layers may also be used at the expense of reduced efficiency. Layer thickness is a function of the wavelength frequency. When the ferromagnetic layer 2 is a transition metal, a thickness of between 15 and 25 nm may be used, and preferably a thickness of 20 nm. Transition metal ferromagnetic layers may also be used for visible light with a thickness between 10-20 nm, and a thickness of 10 nm may be preferable.

The size of the respective layers may be larger than, comparable to or smaller than the wavelength of the incident electromagnetic wave and thus may operate in either the near field or the far field of the electromagnetic wave. The nonmagnetic layer 4 may be made of a metal material. The metal material is preferably a noble metal, such as Au, Ag or Cu, or a metal exhibiting a high conductivity at the particular frequency of operation of the device. For THz plasmons, Cu or Au may be used with thicknesses that may be between 50 nm to 300 nm, and a thickness of 100 nm may be preferable. For visible light, Ag may be used with a thickness between 5 to 50 nm, and a thickness of 10 nm may be preferable.

Where the ferromagnetic layer 2 and the nonmagnetic layer 4 meet an interface 3 is formed. The interface 3 preferably has a low electrical resistance. Preferably the electrical resistance at that interface is between $1 \times 10^{-14}$ $\Omega m^2$ to $1 \times 10^{-16}$ $\Omega m^2$. The term "layer" as used herein and throughout the application may mean a film-like planar structure, although it should also be understood that usage of the term "layer" may also encompass structures made of more than one component layer and structures made of composite materials that are non-planar in structure. For example the ferromagnetic layer may be a bilayer of two separate ferromagnetic materials; or one ferromagnetic material and a thin antiferromagnetic material that's used to induce a magnetic anisotropy. The layer may also be a multilayered 3D structure.

Upon application of an appropriate magnetic field, electron spins in the ferromagnetic layer 2 are polarized along the axis of the applied magnetic field. The excitation of an electromagnetic wave source 20 will induce finite current density into the nonmagnetic layer 4 from the ferromagnetic layer 2. In some embodiments, electromagnetic wave source 20 may be external to the plasmon-spintronic device 100. The magneto-impedance, or magneto-resistance, due to the electron spin accumulation will attenuate the amplitude electromagnetic wave depending on the strength and direction of the applied magnetic field, which may be an externally applied magnetic field. Properly designed structures will exhibit resonance and magneto-resistance, magneto-impedance, and they will be capable of nonvolatile switching, modulation, frequency filtering and/or temporal filtering functions.

In FIG. 1 the incoming electromagnetic wave 7 may be either a continuous electromagnetic wave or a pulsed electromagnetic wave and may have a wavelength that is preferably within the frequency range of zero to that of visible light. The electromagnetic wave 7 is transmitted from an electromagnetic wave source 20 to first wave coupler 10 which translates the electromagnetic wave 7 into a surface plasmon wave 15. The first coupler 10 is located above the plasmon transmitter layer 8. The coupler may be made of a high conductivity metal or a highly doped semiconductor. The first coupler 10 transforms the incoming electromagnetic wave 7 into a surface plasmon wave 15 via the scattering of the electromagnetic wave via grating, a metallic dot, a metallic edge, a sub-wavelength aperture or any other sub-wavelength object, or via a prism, a hemispherical lens, an antenna, a plasmonic waveguide, a transmission line, or metallic wire, a sub-wavelength aperture or any other sub-wavelength object.

The transmitter layers 8 and 9 are preferably made of a noble nonmagnetic metal, such as Au, Ag or Cu, or any high conductivity material, such as highly doped semiconductors or conductive oxides, that supports transmittance of surface plasmon waves 15. The thickness of the transmitter layers 8 and 9 may be between 10 nm to 100 nm. From the transmitter layer 8, the surface plasmon wave 15 is then transmitted to the top of the ferromagnetic layer 2 and the nonmagnetic layer 4. The surface plasmon wave 15 is subsequently transmitted from the bottom of the nonmagnetic layer 4 to the second plasmon transmitter layer 9. The surface plasmon wave 15 is then transmitted through the plasmon transmitter layer 9 to the second wave coupler 12, which translates the surface plasmon into an outgoing electromagnetic wave 11. The propagation of the electromagnetic information and energy is thereby perpendicular to the plane of the ferromagnetic layer 2 and non-magnetic layer 4. In the drawings vector "H" refers to the external magnetic field, typically generated by a local source such as an electric current in a wire, coil of wires, or set of integrated wires. The direction of the magnetic field H direction represented in the figure as a vector which can be oriented in directions $\phi$ and $\theta$ relative to the (x,y,z) Cartesian coordinates represented in the figure. The magnetic field can be either, of a constant amplitude, variable amplitude, single frequency, multi frequencies, or pulsed depending on the desired mode of operating the device (i.e switch, modulator, or memory). When H is applied in the plane of film 2 and sufficiently large, the magnetization of layer 2 will be uniform and current crossing the interface 3 will have net spin polarization. Here $J_p$ refers to the spin-polarized current which diffuses, both forwards and backwards, across interface 3.

One of ordinary skill should also understand that the electromagnetic information and energy can also propagate parallel to the plane of the ferromagnetic layer 2 and the nonmagnetic layer 4. The ferromagnetic layer 2 and nonmagnetic layer 4 may be given lateral extent in the plane, for example in the form of a plasmon waveguide, an example of which is shown in FIG. 7. Surface plasmon waves 15 may propagate for a substantial distance along the waveguide, the transmitted surface plasmons 15 may exist on either side of the ferromagnetic layer 2 and the non-magnetic layer 4, and the second coupler 12 may be placed on either side of the ferromagnetic layer 2 and nonmagnetic layer 4. The outgoing electromagnetic wave 11 may be transmitted from either the top or bottom surface of the ferromagnetic layer 2 and non-magnetic layer 4, after having propagated across some lateral distance. The transmitted electromagnetic wave 11 (which may be either pulsed or continuous) is ultimately transmitted to the electromagnetic wave detector 22.

Still referring to FIG. 1, the layer order of ferromagnetic layer 2 and the nonmagnetic layer 4 may not be important. Reversing the layers so that the nonmagnetic layer 4 is on top of the ferromagnetic layer 2 is also expected to have the same functionality as the depicted plasmon-spintronic device 100.

The ferromagnetic layer 2 may be comprised of more than one ferromagnetic component material, while the nonmagnetic layer 4 may be made of more than one nonmagnetic component material. In one example, the ferromagnetic layer 2 may be comprised of two component layers of ferromagnetic materials in order to achieve particular magnetization anisotropy. In another example, the ferromagnetic layer 2 may be comprised of multiple component materials and may include a synthetic anti-ferromagnetic layer (SAF) in order to minimize fringe magnetic fields. In yet a further example, either the ferromagnetic layer 2 or the nonmagnetic layer 4 may include a component layer that passivates the structure against oxidation or other degradation.

It should be understood that when the terms "ferromagnetic layer" or "non-magnetic layer" are used that either of the terms may be referring to a layer that is comprised of more than one component material. In those scenarios where the terms "ferromagnetic layer" or "non-magnetic layer" are referring to a layer that is made of more than one component material it should be understood that the term "ferromagnetic layer" is referring to more than one component material, wherein when the collective components are taken together have a predominant characteristic of being "ferromagnetic," while "non-magnetic layer" is referring to more than one component material wherein when the collective components are taken together have a predominant characteristic of being non-magnetic. In the context of spintronic devices, the dominant characteristics of "ferromagnetic" include: having a spontaneous magnetization that may be oriented and maximized in response to an external magnetic field or may be minimized in response to a demagnetizing field, the magnetization is capable of showing remenance, the electronic structure of the material is such that electric current in the material has a net spin polarization and the orientation of the polarized spins is related to the magnetization orientation.

Still referring to FIG. 1, when the plasmon-spintronic device 100 is used there is a finite current injection from a ferromagnetic layer 2 into the nonmagnetic layer 4 of the plasmon-spintronic device 100 and a spin accumulation occurs within the spin diffusion length of the nonmagnetic layer 4. The spin accumulation acts as a "bottleneck" for electron spin and charge motion and is characterized by an excess interface resistance and/or impedance. This current density is functionally equivalent with the electrically driven spin injected current in traditional spintronic devices. The spin polarized "current injection" across the interface is in response to the electric field associated with the plasmon. For a short pulse the "current injection" goes in one direction across the interface, and equilibrates after the pulse passes. For a longer pulse, with several cycles of EM field, the "injected current" is driven forward, then backward, etc. across the interface.

In utilizing the plasmon-spintronic device 100, an applied magnetic field source 25 (DC, AC, or pulsed) may be used to control the magnetization state of the ferromagnetic layer 2 in the plasmon-spintronic devices. The applied magnetic field source 25 may be located externally, proximate to, or be part of the plasmon-spintronic device 100 so as to be able to alter or fix the magnetization state of the ferromagnetic layer 2. The magnetization state of the ferromagnetic layer 2 may be either substantially zero or alternatively non-zero with spatial orientation. By substantially zero it is meant that the net magnetization of the ferromagnetic layer 2 is negligible. In particular and as is known to those skilled in the art, ferromagnetic layer 2 is described as having numerous magnetic domains. Each domain has magnetization magnitude equal to the value known as the saturation magnetization. In an unmagnetized state, the orientation of the magnetization of each domain is random and layer 2 has a net magnetization that is a small fraction (the order of 1 percent) of the saturation magnetization. An external magnetic field with magnitude larger than the coercive field value will align the magnetization orientation of nearly all the domains and the entire layer 2 has magnetization magnitude equal to the saturation magnetization. Application of a small magnetic field of appropriate direction, or of a sequence of fields with varying directions, can have the result that the orientation of the magnetization of all the domains will again randomize and the net magnetization of layer 2 will have negligible value. The magnetization state of the ferromagnetic layer 2 alters the physical properties of the electromagnetic wave 7 when it is non-zero. When electromagnetic waves 7 traverse the plasmon-spintronic device 100 when the magnetization state of the ferromagnetic layer 2 is essentially zero then relatively little or no attenuation or insignificant phase retardation of the electromagnetic wave 7 occurs. When electromagnetic waves 7 traverse the plasmon-spintronic device 100 when the magnetization state of the ferromagnetic layer 2 is non-zero then substantial attenuation occurs. Also minimal polarization transformation occurs to the electromagnetic waves 7 when the magnetic state is zero, or substantially zero, whereas when the magnetization state of the ferromagnetic layer 2 is non-zero then a relatively large polarization transformation occurs.

The underlying process that controls the effect of the magnetization state of plasmon-spintronic devices is described below. In the embodiment shown in FIG. 1, the applied magnetic field orients the magnetic domains in the ferromagnetic layer 2. The application of the magnetic field therefore polarizes the electron spins in the ferromagnetic layer 2 in a specific direction relative to the incident polarization of the driving electromagnetic field. In this situation, coherent radiation incident on the ferromagnetic layer 2 and the nonmagnetic layer 4 induces a significant spin accumulation in the nonmagnetic layer 4. The accumulation of electron spin impedes the further flow of spin-polarized electrons into the nonmagnetic layer 4, which effectively creates an additional source of resistive loss and/or phase retardation for the electromagnetic wave 7. This spin accumulation loss gives rise to large attenuation and/or phase retardation and/or polarization change of the radiation propagated through the plasmon-spintronic device 100. Note that if the ferromagnetic layer 2 in the plasmon-spintronic device 100 has no net magnetization the domains may be smaller than the spin diffusion length in the nonmagnetic material 4. In this case, spin polarized electrons from contiguous domains become randomized in the nonmagnetic material 4, and spin accumulation is inhibited.

Figure 2:
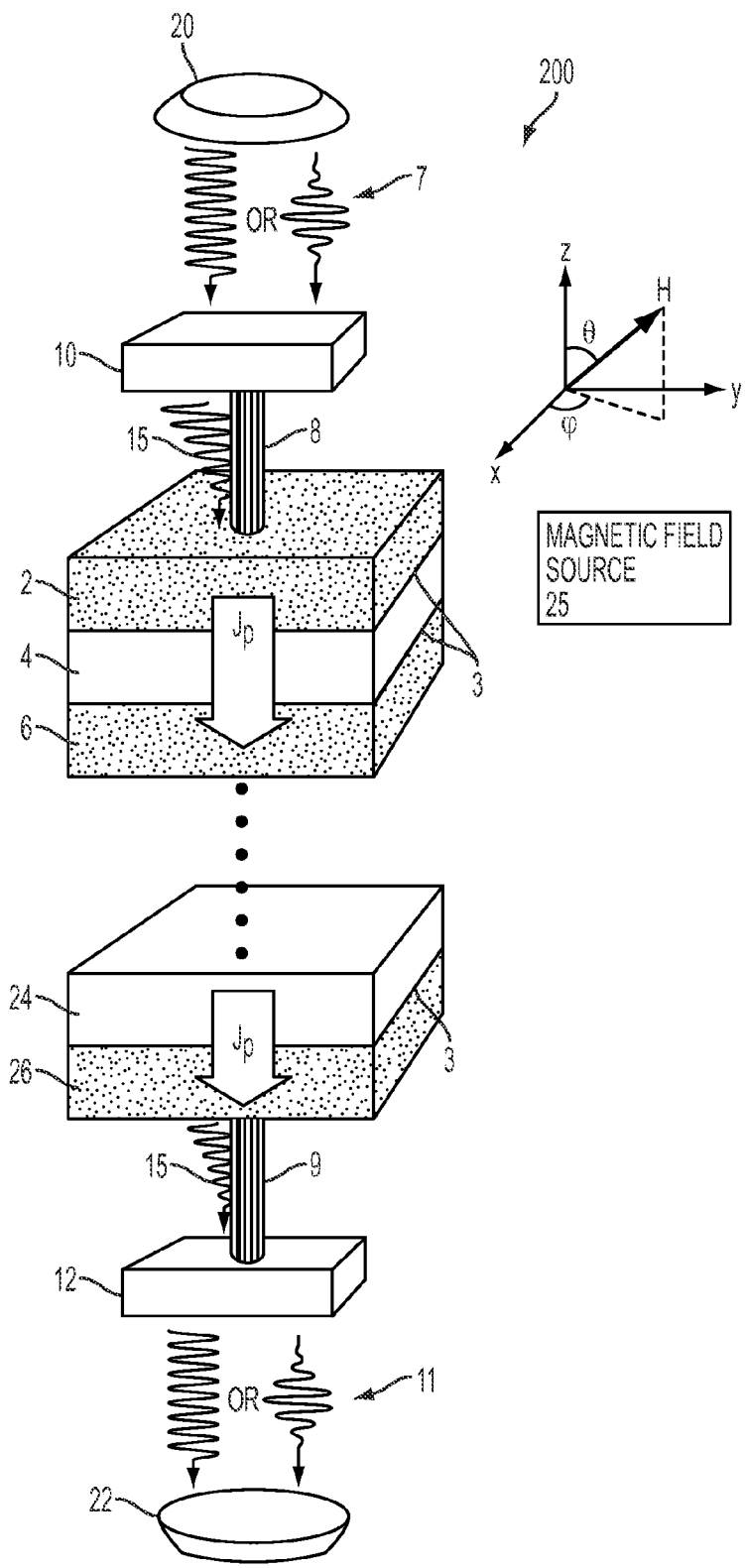
FIG. 2 shows a photonic/plasmonic device two ferromagnetic layers and a nonmagnetic layer, in accordance with an embodiment of the present invention.

In FIG. 2 another embodiment of the present invention is shown. The characteristics of the components shown in FIG. 2 having like numerals are the same as discussed above with respect FIG. 1.

The plasmon-spintronic device 200 is comprised of a first ferromagnetic layer 2, a nonmagnetic layer 4 and a second ferromagnetic layer 6. This plasmon-spintronic device 200 forms a structure known in spintronics as a spin valve structure. Also shown in FIG. 2 are third ferromagnetic layer 26 and second nonmagnetic layer 24. It should be understood that any number of layers may be included in some embodiments. While the ferromagnetic layer 2, the nonmagnetic layer 4 and the second magnetic layer 6 are shown in an ordered arrangement, the arrangement of the layers may be in a random arrangement or an ordered arrangement depending upon the desired results. The magnetoresistance properties of the spin valves also characterize the resistive magnetoimpedance response at high frequency. When the magnetization orientations of the respective ferromagnetic layers are parallel the electrical resistance is relatively low. When the magnetization orientations of the respective ferromagnetic layers are anti-parallel, the electrical resistance is relatively high.

In the embodiment shown in FIG. 2, the first ferromagnetic layer 2 has a relatively large magnetic coercivity and its orientation remains pinned along one direction. The applied magnetic field is used to control the orientation of the second ferromagnetic layer 6 so as to be parallel or antiparallel with the first magnetic layer 2. Properly designed structures will exhibit remanence and magnetoresistance and/or magnetoimpedance, and they will be capable of nonvolatile switching, modulating, frequency filtering, and/or temporal filtering functions. Furthermore, similar to the embodiment discussed above with respect to FIG. 1, the plasmon-spintronic device 200 may have a first ferromagnetic layer 2 and a second ferromagnetic layer 6 that are comprised of more than one component material. Likewise, the nonmagnetic layer 4 may be comprised of more than one component material.

Still referring to FIG. 2, when using this plasmon-spintronic device 200 the radiation-induced current density in the vicinity of the plasmon-spintronic device 200 encounters a spin dependent resistance and/or impedance that depends on the relative magnetization orientations of the first ferromagnetic layer 2 and the second ferromagnetic layer 6. The first ferromagnetic layer 2 in the plasmon-spintronic device 200 has a relatively large magnetic coercivity and the second ferromagnetic layer 6 has a small coercivity. The applied magnetic field orients the magnetization of first ferromagnetic layer 2 to be either substantially parallel or anti-parallel with the magnetization orientation of the magnetization of the second ferromagnetic layer 6. When the magnetization of the first ferromagnetic layer 2 and the magnetization of the second ferromagnetic layer 6 are anti-parallel the plasmon-spintronic device 200 has a relatively large electrical resistance and/or impedance and the radiation attenuation and/or phase retardation, and/or polarization change is therefore relatively large. When the magnetization of the first ferromagnetic layer 2 and the magnetization of second ferromagnetic layer 6 are parallel the plasmon-spintronic device 200 has a relatively small electrical resistance and/or impedance and the radiation attenuation and/or phase retardation and/or polarization change is therefore relatively small.

Figure 3:
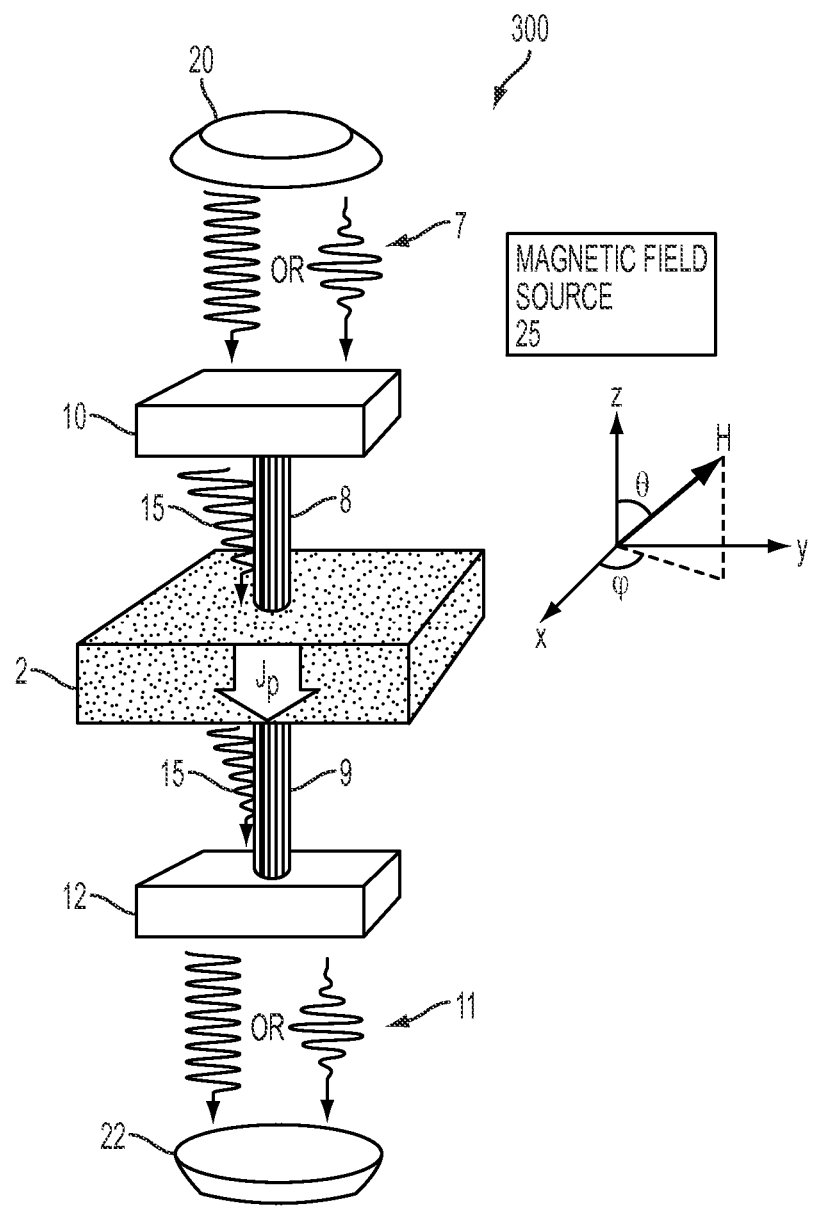
FIG. 3 shows a photonic/plasmonic device having only a ferromagnetic layer, in accordance with an embodiment of the present invention.

Now referring to FIG. 3, wherein another embodiment of the present invention is shown. The characteristics of the components shown in FIG. 3 having like numerals are the same as discussed above with respect FIG. 1.

In FIG. 3, a plasmon-spintronic device 300 is shown that operates based on the principle of anisotropic magneto-resistance and/or magneto impedance inherent to the ferromagnetic layer 2. The principle underlying the operation of this type of device can be understood by considering an arrangement (random or ordered) of ferromagnetic sub-wavelength sized patterned thin film structures. When coherent electromagnetic radiation (optical to radio frequencies) is coupled to the arrangement of ferromagnetic structures within the ferromagnetic layer 2, the electric and magnetic fields of the electromagnetic radiation penetrates into the layer's surface and induces current density motion at the surfaces of the ferromagnetic layer 2. The flow of the induced current density may be governed by the relative magnetization orientation of a single ferromagnetic layer 2 in the plasmon-spintronic device 300. The magnetization is relative to the direction of the induced charge flow. An external magnetic field may be used to change and to control the magnetization of the ferromagnetic layer 2 so as to be parallel or perpendicular with the surface current density and the resulting radiation attenuation is relatively large or small.

In the plasmon-spintronic devices discussed above, the applied magnetic field (DC, AC or pulsed) is introduced so as to align the net magnetization of the ferromagnetic layers along the magnetic field direction. That is, the applied magnetic field aligns the magnetization at a specific direction relative to the incident polarization of the driving electromagnetic wave. When the orientation of the magnetic field relative to the polarization is parallel, the electronic resistivity (and/or impedance) of the ferromagnetic layers is high due to maximum spin orbit scattering. When the orientation of the magnetic field relative to the polarization is perpendicular, the electronic resistivity (and/or impedance) of the ferromagnetic layers is low due to minimum spin orbit scattering.

This anisotropic magneto-resistance and/or magneto impedance effect creates an additional source of electronic resistive loss for the electromagnetic field giving rise to large attenuation and/or phase retardation and/or polarization change, of the radiation propagated through the plasmon-spintronic devices. Thus one can use the phenomenon of anisotropic magneto-resistance and/or impedance for modulation, switching, phase shifting, filtering, etc. of electromagnetic waves (optical to radio frequencies).

Experiments on composite media have demonstrated that anisotropic magneto-resistance and/or magneto impedance associated with the ferromagnetic layer 2 causes the device to exhibit transmission birefringence depending on the relative orientation of the external magnetic field and the incident electromagnetic wave polarization. When the magnetic field orientation is parallel to the incident polarization of the radiation electric field, the magneto-resistance and/or magneto impedance is high relative to the perpendicular configuration. This magnetically induced birefringence also enables such plasmon-spintronic devices to function as magnetically sensitive photonic polarization modulation elements.

The application of a magnetic field will induce birefringence in the device, which will cause polarization transformation of the transmitted radiation. By placing a polarization analyzer at the plasmon-spintronic device output, the polarization transformation can be mapped onto an intensity modulation. For example, a representative rudimentary plasmonic medium comprises a random ensemble of sub-wavelength sized ferromagnetic/paramagnetic metallic particles. The ensemble of the metallic particles is excited by linearly polarized, coherent terahertz radiation. The terahertz radiation transmitted through the sample is modulated in terms of the transmission amplitude, arrival delay, and polarization due to the electron spin accumulation effect and/or anisotropic magneto-resistance and/or magneto impedance in the plasmon-spintronic devices described above. This effect enables large amplitude, temporal (arrival delay), and polarization modulation of electromagnetic signals propagated through the plasmon-spintronic devices by applying a relatively small biasing magnetic field to the plasmon-spintronic devices in order to control the spin state of the ferromagnetic layer 2.

It should be understood that the operation of the plasmon-spintronic devices is not limited to any particular frequency regime or any particular physical manifestation of a plasmon-spintronic device. As long as the plasmon-spintronic device supports collective conduction band electron oscillations and electron spin-dependent transport, the device operation follows the principles discussed above.

Although the embodiments herein incorporate an arrangement of sub-wavelength structures and/or a two-dimensional transmission line geometry, various other structures could be used including but not limited to ridge waveguides, photonic bandgap arrangements or structures, and periodic or spatially modulated structures.

Figure 4A:
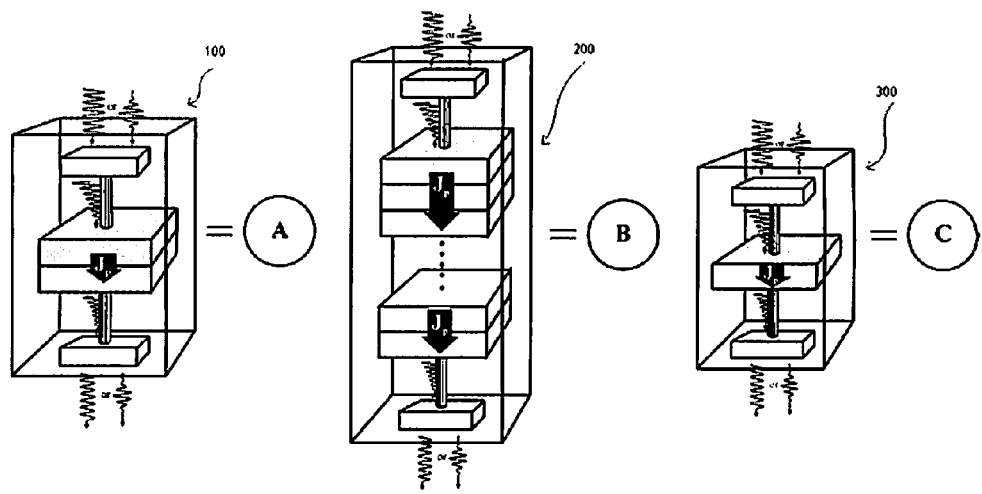
FIG. 4(a) shows the embodiments shown in FIGS. 1, 2 and 3 and their corresponding reference letter used in illustrating the networks shown in FIGS. 4(b) and 4(c).
Figure 4B:
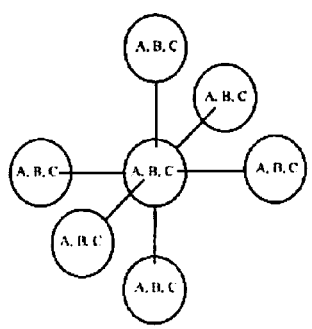
FIG. 4(b) is a schematic of a network using the plasmon-spintronic devices shown in FIG. 4(a)
Figure 4C:
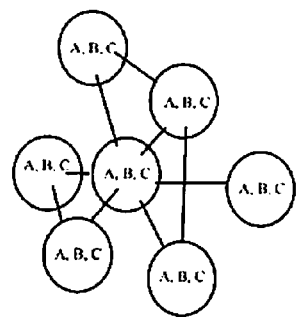
FIG. 4(c) is another schematic of a network using the plasmon-spintronic devices shown in FIG. 4(a).

Now referring to FIGS. 4(a)-4(c), plasmon-spintronic devices 100, 200 and 300 are respectively referred as A, B, and C in FIG. 4(a) and are illustrated as interconnected to form networks of plasmon-spintronic devices having multi-functionalities wherein each device independently serves a single function. The networks shown in FIGS. 4(b) and 4(c) are depicted in a schematic fashion to indicate that the electromagnetic information and energy in any given device may be transmitted perpendicular to, or parallel with, the plane of the layers that form the plasmon-spintronic devices 100, 200, 300. It should be understood, that while reference is made to layers, the plasmon-spintronic devices 100, 200, 300 may be constructed using composite media and such constructions can be used in the networks of FIGS. 4(b) and 4(c). Additionally, each of the plasmon-spintronic devices 100, 200 and 300 may be fabricated on the surface of a semiconductor chip. The plasmon-spintronic devices may be interconnected by plasmon waveguides or plasmonic couplers.

In another embodiment, the interconnecting plasmon waveguides, discussed above, could themselves be plasmon-spintronic devices. The switching state of each device may be determined using local magnetic fields provided by micro-electronic components integrated on the chip. In this way sub-circuits and circuits can be fabricated using plasmon-spintronic devices as components, and the circuits may be changed or altered using integrated control currents or voltages merely by changing the local magnetic fields at a variety of sites on the chip.

Figure 5A:
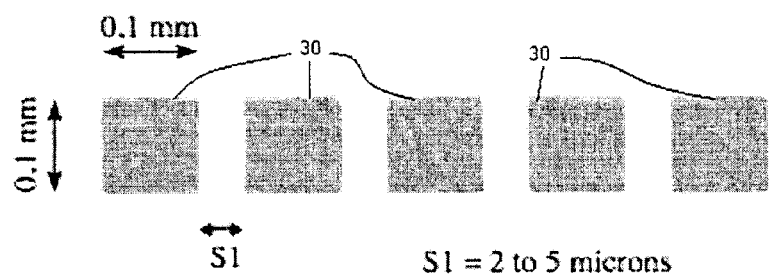
FIG. 5(a) is top view of a series of thin film metal squares fabricated on a chip forming an integrated transmission line for THz pulses on an optoelectronic device.
Figure 5B:
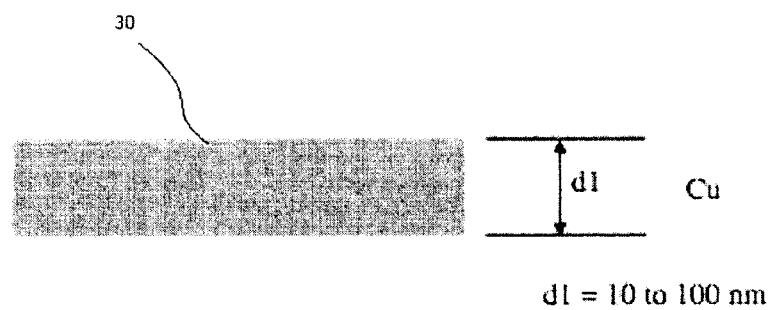
FIG. 5(b) is a side view of the thin film metal square shown in FIG. 5(a).
Figure 6:
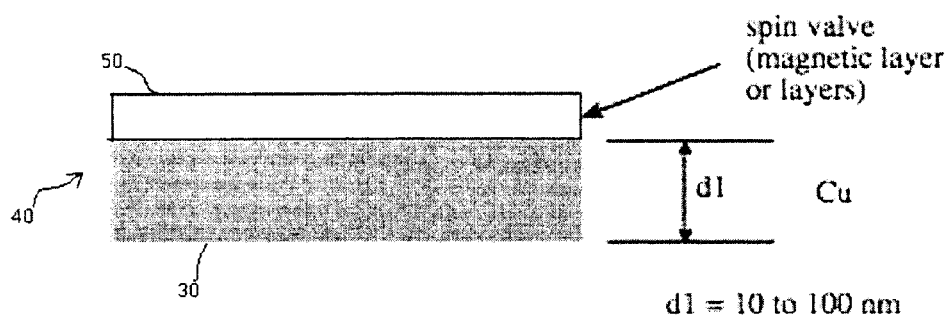
FIG. 6 is a side view of a multilayer thin film which acts as a plasmon-spintronic device functioning as a switch.

Now turning to FIGS. 5(a)-6, these figures illustrate the usage of a plasmon-spintronic device. A magnetic field source may be present in FIGS. 5(a)-6 but is not shown in the Figures. FIG. 5(a) is top view of a series of thin film metal squares 30 which may be fabricated on a chip forming an integrated transmission line for THz pulses on an optoelectronic device. The line of thin film metal squares 30 may be made of a metal such as Au or Cu. In the embodiment shown each of the thin film metal squares 30 are 0.1 mm by 0.1 mm in length and width. Utilizing smaller length and width scales can provide a transmission line for visible light pulses. The distance Si between the thin metal squares may be between 2 to 5 microns. The THz pulses may be transmitted over distances up to the order of 1 cm. FIG. 5(b) is a side view of a thin film metal square 30 shown in FIG. 5(a). The depth of the thin film metal square 30 may be between 10 to 100 nm.

FIG. 6 is a side view of a spintronic-plasmonic switch 40 that may be used in the transmission line. In FIG. 6 the spintronic-plasmonic switch 40 uses the same type of thin film metal square 30 as its base. On top of the thin film metal square 30 is a ferromagnetic layer 50, thereby creating a device of type embodiment 1. A magnetic field may be generated on the chip on which the transmission line resides. The generated magnetic field may orient the magnetization of the magnetic layer 50 and set the state of the plasmonic switch 40. In practice it may take more than one plasmonic switch 40 in order to diminish the amplitude and/or change the phase of a pulse on the transmission line.

Figure 7A:
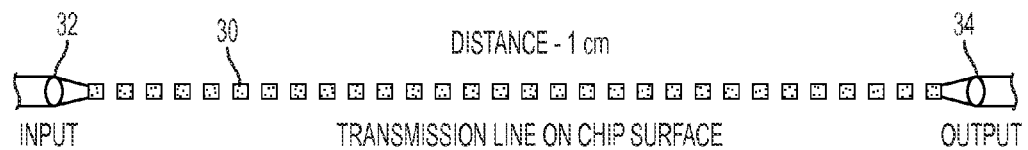
FIG. 7(a) shows a transmission line on a chip surface in an optoelectronic device.
Figure 7B:
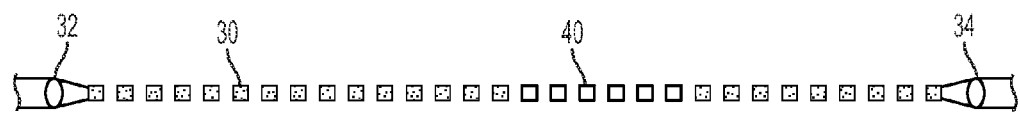
FIG. 7(b) shows a plasmon-spintronic device functioning as a switch located within the transmission line shown in FIG. 7(a).

FIG. 7(a) shows a transmission line made of the thin film metal squares 30 on a chip surface in an optoelectronic device. A magnetic field source may be present in FIGS. 7(a)-7(c) but is not shown in the Figures. In FIG. 7(a) a pulse of THz radiation is coupled to the input end 32 of a transmission line and propagates across the chip surface. At the other end there is an output 34, which may be transducer, and the THz radiation is sent elsewhere. FIG. 7(b) shows a plasmon-spintronic device functioning as a plasmonic switch 40 located within the transmission line shown in FIG. 7(a). A series of squares of the kind shown in FIG. 6 is used and the cumulative effect forms the switch. The plasmonic switch 40 has two magnetization states. The magnetization states are determined by the magnetization orientation of the magnetic layers 50 shown in FIG. 6. The states are set by an on-chip source of the magnetic field. In one state the pulse is transmitted without loss of amplitude. In the second state (i.e. a non-zero magnetization sate) the pulse amplitude is diminished exponentially. This is an example of a programmable plasmonic switch 40. The pulse may be transmitted or terminated (or attenuated to a desired amplitude) according to how the plasmonic switch 40 is set. A variation of this is that the magnetic properties of the magnetic layers 50 and or the length of the plasmonic switch 40 can be chosen so that the phase of the pulse is delayed. In one state the pulse is transmitted without change of phase. In the second state (i.e. a non-zero magnetization state) the pulse is transmitted with phase delay.

Figure 7C:
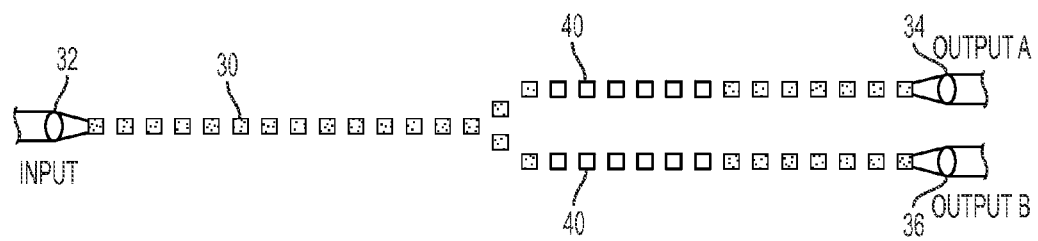
FIG. 7(c) shows a transmission line on a chip surface that uses a plasmon-spintronic device functioning as switch for transmitting the radiation to different outputs.

FIG. 7(c) shows a transmission line on a chip surface that uses a plasmon-spintronic device functioning as a plasmonic switch 40 for transmitting the radiation to a first output 34 and a second output 36. Here the radiation is split into two pulses traveling on two different lines. One line traveling to first output 34 and one line traveling to second output 36. Plasmonic switches 40 are integrated into portions of both of the lines. The states of the two plasmonic switches 40 are always orthogonal. When the one plasmonic switch 40 is set to a state that permits transmission the state of the other plasmonic switch 40 is set to a state that causes termination and vice-versa. In this way, the input pulse is routed to the first output 34 and the second output 36 according to instructions delivered to the two switches. This permits the transmission line to operate as a programmable router and also is a basis for performing Boolean logic.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A photonic/plasmonic monolayer device, comprising:
a source of surface plasmon waves; and
a single ferromagnetic layer having two characteristic states, a first state where the layer has zero net magnetization and a second state where the layer has uniform magnetization and at least some orientation, and wherein a property of a surface plasmon wave is altered by the magnetization state.

2. The photonic/plasmonic monolayer device of claim 1, wherein when the magnetization state of the ferromagnetic layer is non-zero the surface plasmon wave is attenuated.

3. The photonic/plasmonic monolayer device of claim 1, wherein when the magnetization state of the ferromagnetic layer is non-zero the surface plasmon wave is phase delayed.

4. The photonic/plasmonic monolayer device of claim 1, wherein the ferromagnetic layer is a transition metal ferromagnet and has a thickness of between 1 nm and 200 nm.

5. A photonic/plasmonic monolayer device, comprising:
a source of surface plasmon waves; and
a single ferromagnetic layer having a property selected from the group consisting of an anisotropic magneto-resistance and a magneto impedance and having two characteristic states, a first state where the layer has zero net magnetization and a second state where the layer has uniform magnetization and at least some orientation, and wherein a property of a surface plasmon wave is altered by the magnetization state.

6. The photonic/plasmonic monolayer device of claim 5, wherein when the magnetization state of the ferromagnetic layer is non-zero the surface plasmon wave is attenuated.

7. The photonic/plasmonic monolayer device of claim 5, wherein when the magnetization state of the ferromagnetic layer is non-zero the surface plasmon wave is phase delayed.

8. The photonic/plasmonic monolayer device of claim 5, wherein the ferromagnetic layer is a transition metal ferromagnet and has a thickness of between 1 nm and 200 nm.

9. A photonic/plasmonic monolayer device, comprising:
a source of surface plasmon waves; and
a single ferromagnetic layer having a surface and having a property selected from the group consisting of an anisotropic magneto-resistance and a magneto impedance, whereby when a surface plasmon is transmitted across the surface of the single ferromagnetic layer, the electric and magnetic fields of the surface plasmon penetrate into the layer's surface, and whereby the layer has two characteristic states, a first state where the layer has zero net magnetization and a second state where the layer has uniform magnetization and at least some orientation.

10. The photonic/plasmonic monolayer device of claim 9, wherein when the magnetization state of the ferromagnetic layer is non-zero the surface plasmon wave is attenuated.

11. The photonic/plasmonic monolayer device of claim 9, wherein when the magnetization state of the ferromagnetic layer is non-zero the surface plasmon wave is phase delayed.

12. The photonic/plasmonic monolayer device of claim 9, wherein the ferromagnetic layer is a transition metal ferromagnet and has a thickness of between 1 nm and 200 nm.

* * * * *